United States Patent
Fazio et al.

(10) Patent No.: US 9,452,740 B1
(45) Date of Patent: Sep. 27, 2016

(54) WHEEL ROLLER WITH A FORGED CARRIER LINK AND A LOG CHAIN WHEEL ROLLER

(71) Applicant: SONNY'S ENTERPRISES, INC., Tamarac, FL (US)

(72) Inventors: Paul Fazio, Plantation, FL (US); Anthony Analetto, Weston, FL (US)

(73) Assignee: Sonny's Enterprises, Inc., Tamarac, FL (US)

( * ) Notice: Subject to any disclaimer, the term of this patent is extended or adjusted under 35 U.S.C. 154(b) by 0 days.

(21) Appl. No.: 14/722,617

(22) Filed: May 27, 2015

Related U.S. Application Data (60) Provisional application No. 62/132,776, filed on Mar. 13, 2015.

(51) Int. Cl.
| | |
|---|---|
| *B60S 3/00* | (2006.01) |
| *B65G 39/20* | (2006.01) |
| *B65G 17/24* | (2006.01) |
| *B65G 19/02* | (2006.01) |
| *B65G 19/22* | (2006.01) |

(52) U.S. Cl.
CPC ............. *B60S 3/004* (2013.01); *B65G 17/24* (2013.01); *B65G 19/02* (2013.01); *B65G 19/225* (2013.01); *B65G 39/20* (2013.01); *B65G 2201/0294* (2013.01)

(58) Field of Classification Search
CPC ..... B60S 3/004; B65G 17/061; B65G 17/24; B65G 19/02; B65G 19/205; B65G 19/225; B65G 39/20; B65G 2201/0294
See application file for complete search history.

(56) References Cited

U.S. PATENT DOCUMENTS

| | | | | |
|---|---|---|---|---|
| 3,596,605 | A * | 8/1971 | Shelstad | B61B 10/046 104/172.3 |
| 4,194,449 | A * | 3/1980 | Breau | B60S 3/004 104/162 |
| 4,282,971 | A * | 8/1981 | Becker | B65G 17/02 198/834 |
| 4,374,496 | A * | 2/1983 | Hanna | B65G 19/02 104/172.3 |
| 4,873,929 | A * | 10/1989 | Witecki | B60S 3/004 104/172.3 |
| 5,001,988 | A * | 3/1991 | Agathos | B65G 19/225 104/172.3 |
| 5,140,910 | A * | 8/1992 | Welter | B60S 3/004 104/162 |
| 6,647,894 | B1 * | 11/2003 | Simoes | B61J 3/04 104/172.1 |
| 6,668,731 | B2 * | 12/2003 | Calisi | B61J 3/04 104/172.3 |
| 8,146,511 | B1 * | 4/2012 | Analetto | B60S 3/004 104/165 |
| 8,161,888 | B2 * | 4/2012 | Balash | B60S 3/004 104/165 |

* cited by examiner

*Primary Examiner* — Leslie A Nicholson, III
*Assistant Examiner* — Keith R Campbell
(74) *Attorney, Agent, or Firm* — Laurence A. Greenberg; Werner H. Stemer; Ralph E. Locher (57) ABSTRACT

A wheel roller for a chain conveyor of an automated carwash has a direct connection of the wheels to the carrier link. The wheel roller contains a carrier link and a roller frame supported by the carrier link. The roller frame has a plurality of pins rigidly connected to the carrier link. A plurality of wheels is supported by the pins of the roller frame. Because the roller frame is rigidly connected (e.g. welded) to the carrier link, the wheels cannot rotate about the carrier.

14 Claims, 8 Drawing Sheets

WHEEL ROLLER WITH A FORGED CARRIER LINK AND A LOG CHAIN WHEEL ROLLER

CROSS-REFERENCE TO RELATED APPLICATION

This application claims the priority, under 35 U.S.C. §119, of U.S. provisional patent application No. 62/132,776, filed Mar. 13, 2015, the prior application is herewith incorporated by reference in its entirety.

BACKGROUND OF THE INVENTION

Field of the Invention

The invention relates to wheel rollers used in conveyors of automated vehicle carwashes. Carwash conveyors convey rollers along a pathway defining the automated carwash. The rollers are configured to engage wheels of a vehicle, and convey a vehicle from an entrance to an exit. The rollers are attached to an endless, conveyor chain and rotate between the entrance and the exit.

Carrier links are an integral part of the roller chain used in conveyor based carwash applications. More specifically, the carrier link attaches the rollers to the conveyor chain. The rollers presently available in the market for log chains require the welding of different components to create the carrier link.

Known roller assemblies generally comprise a long bent bar that has a first end for carrying the rollers and a second end having a carrier link for attaching into a chain. The long bent bar and the related carrier link are subject to excessive wear and tear during operation and are subject to high failure rates. There is a need in the market place for a roller assembly that is more robust and thus has a reduced amount of wear points subject to failure.

SUMMARY OF THE INVENTION

It is accordingly an object of the invention to provide a wheel roller that overcomes the above-mentioned disadvantages of the prior art devices and is more robust in design and has a longer service life between failures.

With the foregoing and other objects in view there is provided, in accordance with the invention, a wheel roller. The wheel roller contains a carrier link and a roller frame supported by the carrier link. The roller frame has a plurality of pins rigidly connected to the carrier link. A plurality of wheels is supported by the pins of the roller frame. Because the roller frame is rigidly connected (e.g. welded) to the carrier link, the wheels cannot rotate about the carrier link and therefore the wheel roller is more robust than known prior art wheel rollers.

In accordance with an added feature of the invention, the roller frame has two pins and one of the pins is directly and rigidly connected to the carrier link. Ideally, the roller frame has two pins and both of the pins are directly and rigidly connected to the carrier link.

In accordance with an additional feature of the invention, the carrier link has an upper section with a first end and a second end. The first end has a vertically oriented wall and one of the pins is rigidly connected to the vertically oriented wall.

In accordance with another feature of the invention, the roller frame has a top brace plate with a first end and a second end. The second end of the upper section of the carrier link is rigidly connected to the second end of the top brace plate.

In accordance with a further feature of the invention, the carrier link has a bottom link section, an upper section and an intermediate section connecting the upper section to the bottom link section. Ideally, the carrier link is formed as a unitary part.

In accordance with an added additional feature of the invention, the plurality of wheels is four wheels and none of the four wheels can pivot about the carrier link. In this manner, the carrier link is not subjected to the forces and thus wear and tear of the pivoting wheels.

In accordance with yet another feature of the invention, the bottom link section has a first width, the intermediate section has a second width and the upper section has a third width. The third width is greater than the second width, and the first width is greater than the third width.

In accordance with another added feature of the invention, the carrier link has exactly four openings formed therein. In this manner, the carrier link can be added in existing conveyors chains with limited effort.

In accordance with still a further feature of the invention, the carrier link has a first length FL and the roller frame has a second length SL, where SL/FL<1.5. Ideally, the ratio of SL/FL is less than 1.2. This results in a compact design of the wheel roller.

In accordance with another feature of the invention, the carrier link has a lower part with a shape selected from the group consisting of a C-shape and a chain link shape.

In accordance with a feature of the invention, the carrier link is welded to the roller frame at three separate points.

In accordance with a concomitant feature of the invention, the plurality of wheels is four wheels disposed on the pins so as to partially overlap the carrier link. With this feature an even more compact and robust wheel roller is possible.

Other features which are considered as characteristic for the invention are set forth in the appended claims.

Although the invention is illustrated and described herein as embodied in a wheel roller with a forged carrier link and a log-chain wheel roller, it is nevertheless, not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
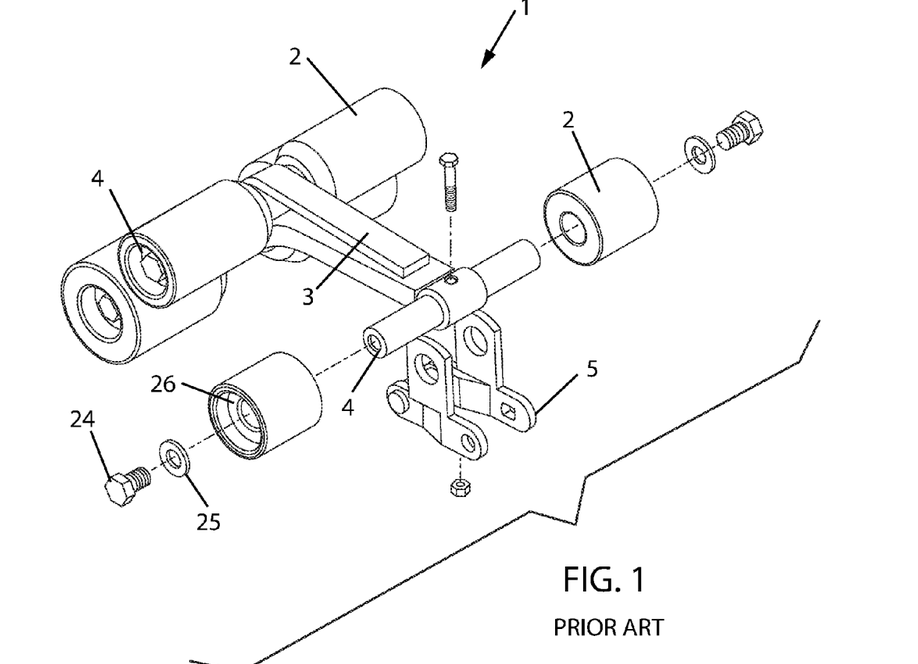
FIG. 1 is a diagrammatic, perspective view of a wheel roller according to the prior art.

Referring now to the figures of the drawings in detail and first, particularly to FIG. 1 thereof, there is shown a known prior art wheel roller 1. The wheel roller 1 has wheels 2 supported on a wheel frame 3 having pins 4 for holding the wheels 2. At a front end, a carrier link 5 is attached to one of the pins 4 supporting its respective wheels 2. As can be seen in FIG. 1, the wheels 2 are held on the pins 4 by a bolt or screw 24 and washer 25 combination housed in a recess 26 formed in the wheels 2.

Figure 2:
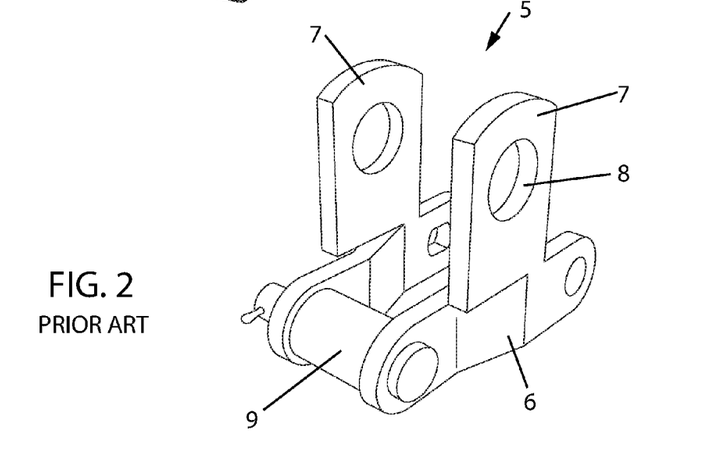
FIG. 2 is a diagrammatic, perspective view of a carrier link used in the wheel roller shown in FIG. 1.

FIG. 2 shows a perspective view of the carrier link 5. The carrier link 5 is formed of a link 6, two vertically extending ears 7 with openings 8 for receiving one of the pins 4, and a link connecting pin 9. A chain is formed from a plurality of links 6 (without the ears 7) being connected together by the respective link connecting pins 9. Within the chain every $X^{th}$ link (e.g. 8, 10, 12, $16^{th}$ link), for example, is formed as the carrier link 5 carrying one of the wheel rollers 1. Thus a chain is formed carrying a plurality of wheel rollers 1. Unfortunately, the ears 7 are subject to high wear and tear resulting in a high incident of failure due to the fact that the wheels 2 and the wheel frame 3 can pivot about the forward or frontal pin 4 connected to the carrier link 5 thus stressing the ears 7. In addition, the elongated wheel frame 3 is also susceptible to a higher rate of failure than desired due to its elongated nature and the stress along the elongated wheel frame 3.

Figure 3:
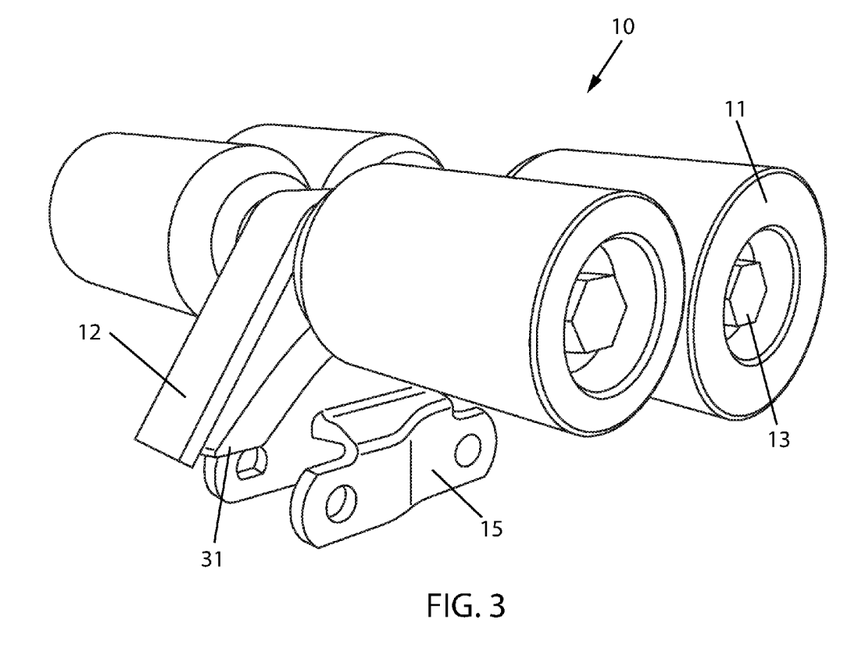
FIG. 3 is a perspective view of a direct connect wheel roller according to the invention.

FIG. 3 shows a design of a direct connect wheel roller 10 according to the invention. As is immediately apparent there is no elongated wheel frame 3. More specifically, the wheel roller 10 has wheels 11 supported on a roller frame 12. The roller frame 12 has wheel support pins 13 for supporting the wheels 11 via a nut and washer combination (see also FIGS. 4A-4D). In addition, the roller frame 12 has a central reinforcement 14 being a top brace plate 14. Disposed beneath the roller frame 12 is a forged carrier link 15. The forged carrier links 15 form a chain by interconnecting with each other. More specifically, the forged carrier links 15 form a #78 chain or an 88 series chain on which the wheel roller 10 is transported.

Figure 4A:
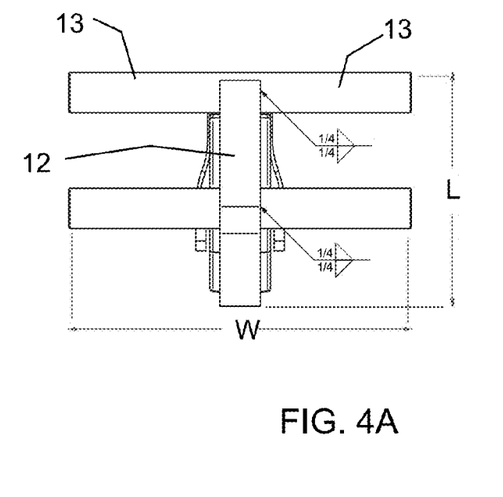
FIG. 4A is a top plan view of the wheel roller of FIG. 3.
Figure 4B:
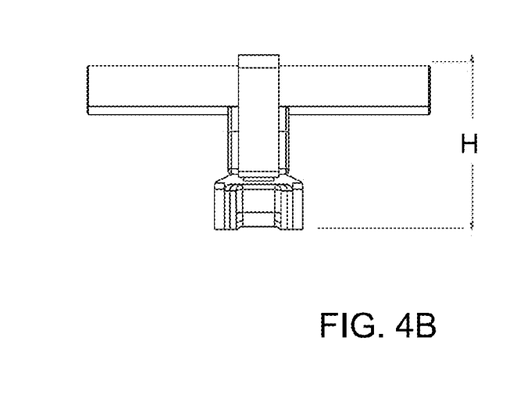
FIG. 4B is a front view of the wheel roller of FIG. 3.
Figure 4C:
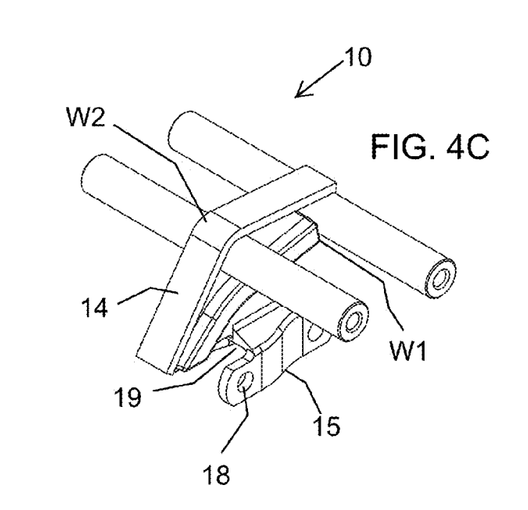
FIG. 4C is a perspective view of the wheel roller of FIG. 3.
Figure 4D:
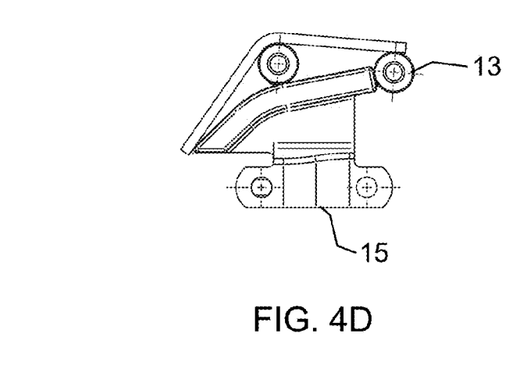
FIG. 4D is a side-elevational view of the wheel roller of FIG. 3.

FIGS. 4A-4D show further views of the wheel roller. Specifically, FIG. 4A shows the pins 13 for holding the removed wheels 11. The pins 13 are formed ideally of metal and have a given length L being ideally 5.8 inches. This thus leads to an overall compact wheel roller 10 having an overall length W of approximately 8.5 inches (defined by the pins 13), a length L of approximately 5.8 inches (defined by the roller frame 12), and a H of approximately 4.33 inches without the wheels.

Figure 5:
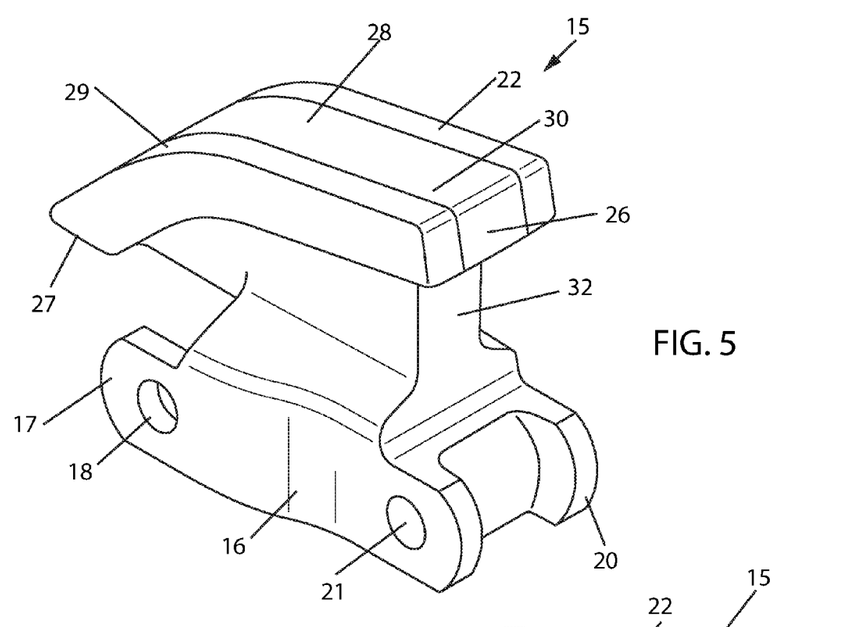
FIGS. 5 and 6 are perspective views of the carrier link shown in FIG. 3.
Figure 6:
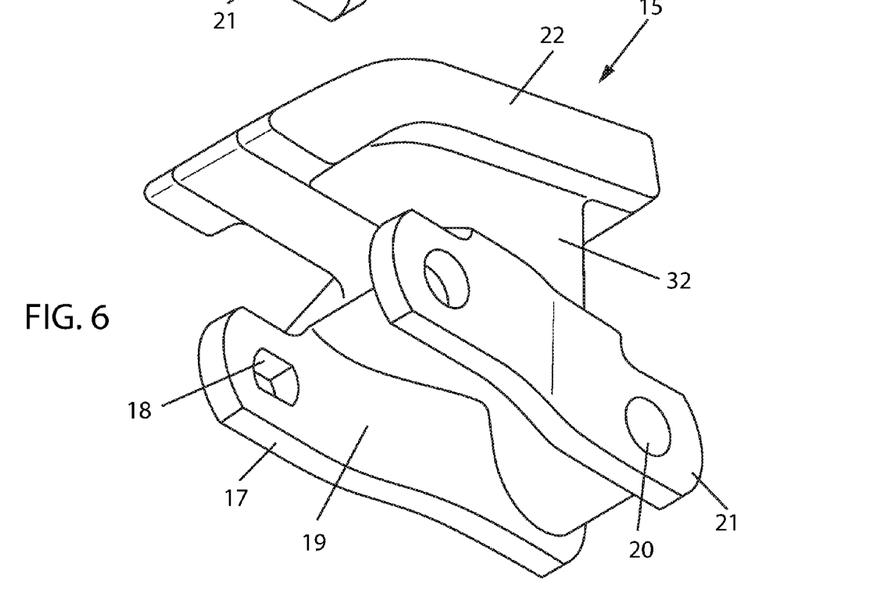

The forged carrier link 15 is independently shown in FIGS. 5 and 6. The forged carrier links 15 each have a link section 16 that can be connected to another respective link section 16 thus forming a chain. The link section 16 has frontal legs 17 each with an opening 18. The front legs 17 are spaced apart for providing a pocket 19 for receiving rear legs 20 of an adjacent link section 16. The rear legs 20 also have openings 21 for receiving a non-illustrated pin for connecting adjacent link sections 16 to each other. As can be clearly seen, the rear legs 20 are disposed closer together than the front legs 17 so that they may be nestled in the pocket 19 of a neighboring carrier link 15. The carrier link 15 also has an upper section 22 for supporting the wheel support pins 13 and the roller frame 12. The upper section 22, in one embodiment, is welded to each of the wheel support pins 13 and the roller frame 12 at weld points W1, W2 (see FIG. 4C). Other forms of joining are also possible including a single cast piece. Therefore, the upper section 22 takes a form that is adapted to the form of the roller frame 12 and its associated pins 13. The carrier link 15 is preferably manufactured out of a metal and is case hardened. The carrier link 15 further has a narrowed intermediate section 32 connecting the upper section 22 to the link section 16.

With such a connection between the carrier link 15 and the roller frame 12 one has what is termed a "direct connection" as the wheels 11 do not (e.g. cannot) pivot about the carrier link 15 (e.g. a direct connect roller). In this manner, less operational stress and thus less wear and tear is experienced by the carrier link 15. Therefore, the wheel roller 10 is more robust than that of the prior art (e.g. wheel roller 1). In addition, the need for an elongated roller support frame is dispensed with and this part is now more robust and subject to less failures.

Figure 7A:
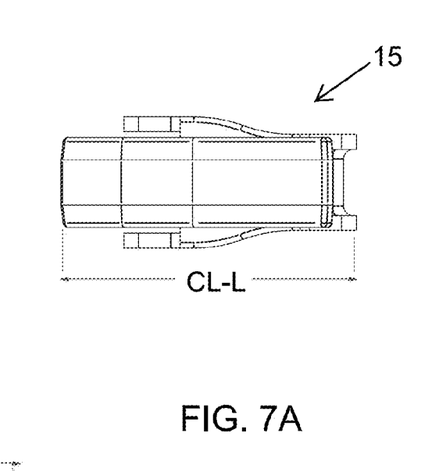
FIG. 7A is a top plan view of the carrier link shown in FIG. 5.
Figure 7B:
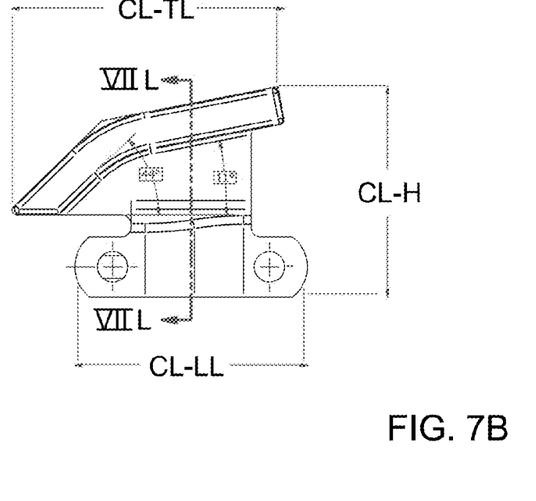
FIG. 7B is a side view of the carrier link shown in FIG. 5.
Figure 7C:
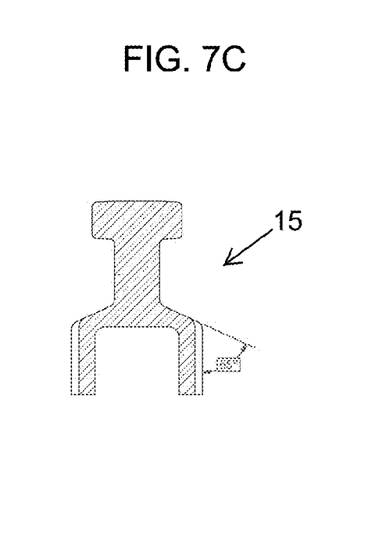
FIG. 7C is a sectional view of the carrier link taken along the line VIIC-VIIC shown in FIG. 7B.

FIGS. 7A-7C show various views of the carrier link 15 and its associated dimensions so that one has an appreciation for the compact design of the carrier link 15. The carrier link 15 has an overall height CL-H being ideally 89.9 mm, an overall length CL-L of 125.06 mm, and a link length CL-LL of ideally 98.45 mm. Of course the ideal lengths, widths and heights can vary significantly depending on the specific application and the desired design forms.

The upper section 22 of the carrier link 15 has a rear or first end 26 being defined by a vertically oriented wall and a front or second end 27 which is perpendicular to the rear end 26. A top surface 28 runs between the first and second ends 26, 27. A first portion 29 of the top surface 28 runs at a given angle and then transitions to a second portion 30 that runs at a less sharp angle. The second end 27 of the upper section 22 is fastened (e.g. welded) to a front end 31 of the top brace plate 14.

Figure 8:
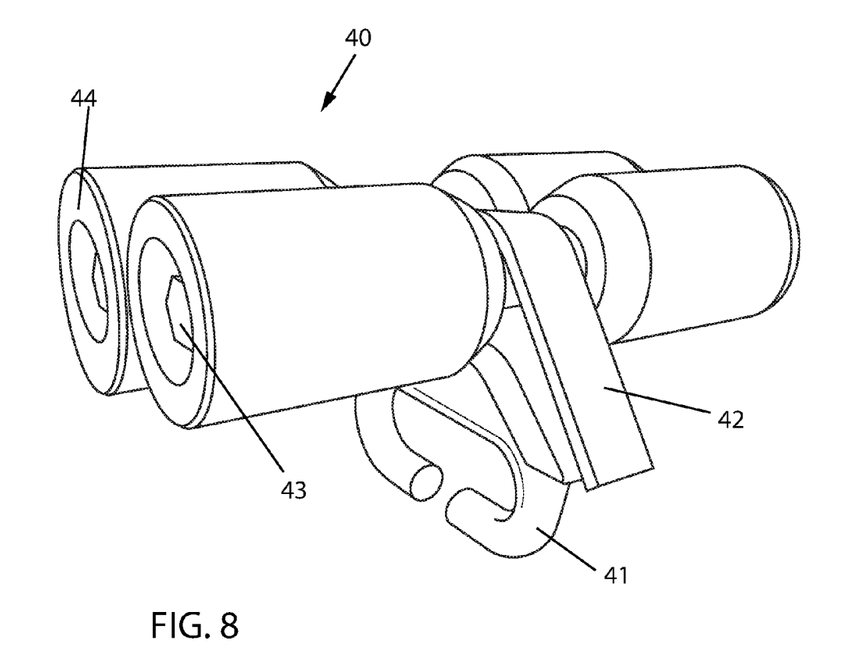
FIG. 8 is diagrammatic, perspective view of a log-chain wheel roller having an improved carrier link according to the invention.
Figure 9:
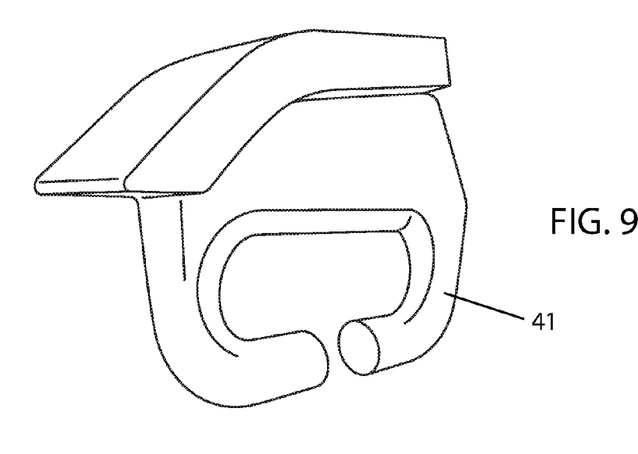
FIGS. 9-11 are perspective view of the carrier link for the log-chain wheel roller shown in FIG. 8.
Figure 10:
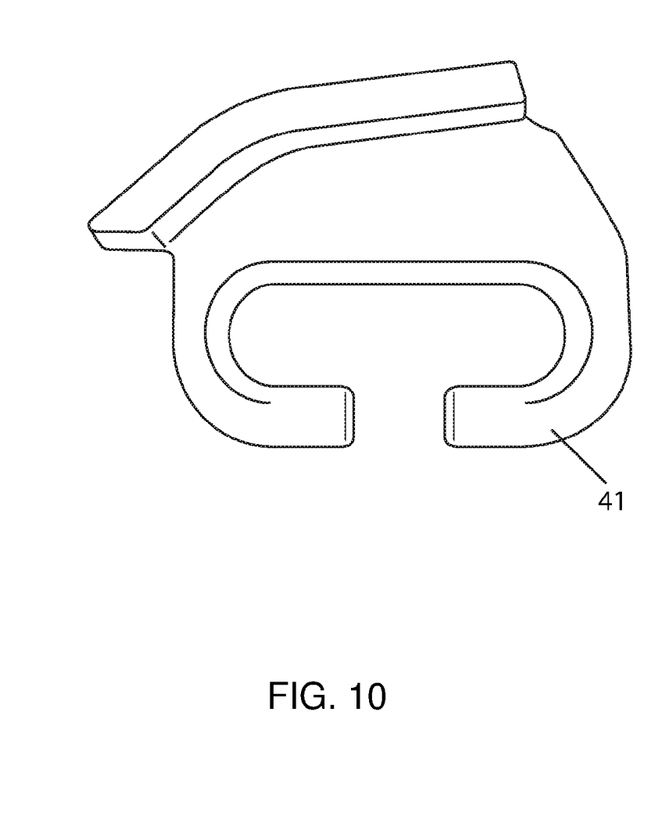
Figure 11:
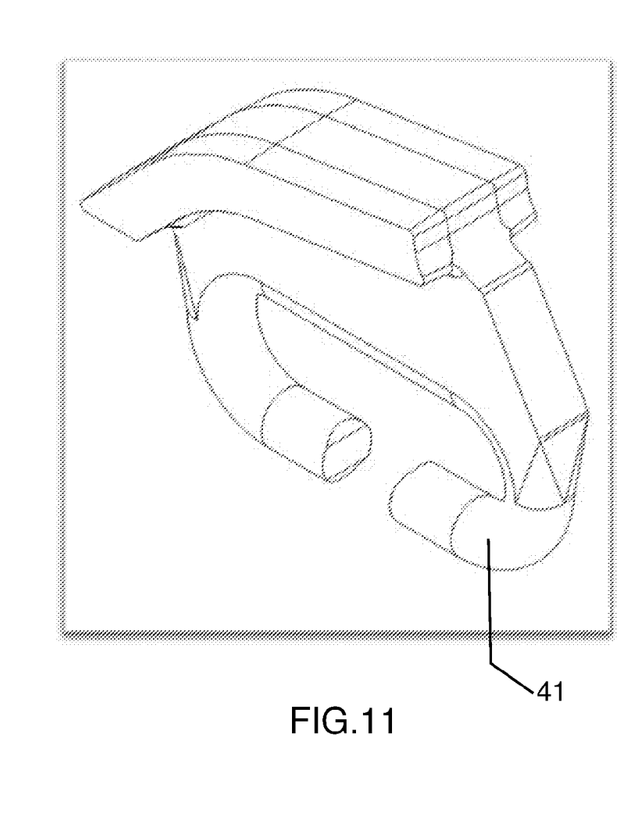

FIG. 8 shows a second type of wheel roller assembly more specifically what is known in the art as log chain wheel roller 40 with forged carrier links 41. The inventive design has been tested under tensile load surpassing open log chain link standards; and extensive field testing was also done to ensure the quality of the carrier link 41. The log-chain wheel roller assembly 40 has the carrier link 41 supporting a wheel frame 42 having pins 43 for holding rollers or wheels 44.

An object of the second embodiment is to reduce wear and extend the life of both the rollers 44 and the connecting chain links 41. The object is achieved in that the carrier link 41 is forged out of a metal alloy and is case hardened. The selected alloy and hardness are specifically configured to properly match the properties of most log chains in the market and therefore reduces wear and extends the life of both the rollers and the connecting chain links. The forging process allows for a consistent material, which is a key factor in life expectancy and performance of the carrier link. This is the first forged carrier link 41 for log chains in the industry.

Figure 12:
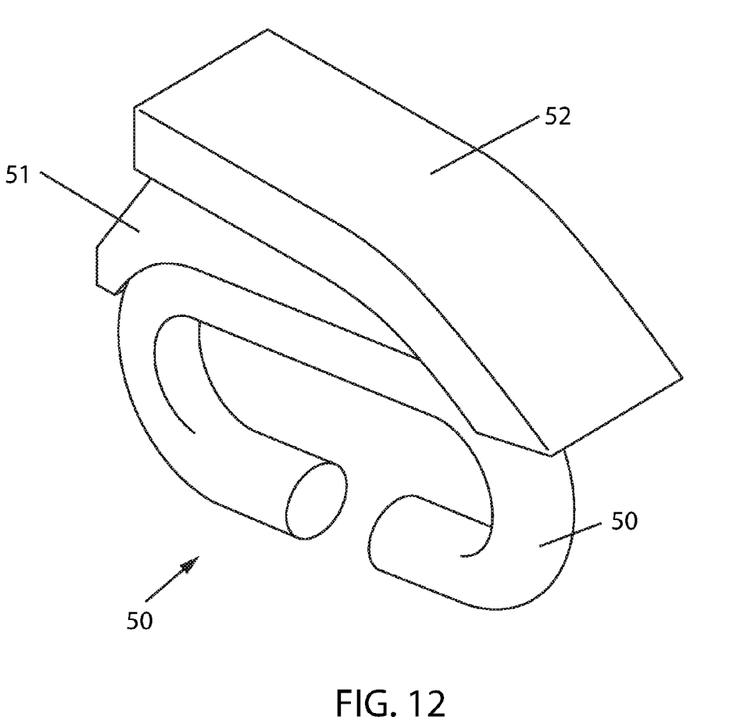
FIG. 12 is a perspective view of a three-piece carrier link.

The forged carrier link 41 must be contrasted with that of prior art construction techniques. More specifically, if the forged carrier link 41 were constructed using prior welding technology it would have been composed of three pieces as shown in FIG. 12. Instead of being forged as a single piece unit, a welded carrier link 50 would consist of an open chain link 51, a brace plate 52 with a profile of the chain link 51, and a flat bar piece 53 all welded together. Due to the three piece welded construction the log-chain carrier link has a higher than desired failure rate.

The invention claimed is:

1. A wheel roller, comprising:
   a carrier link;
   a roller frame supported by said carrier link, said roller frame having pins rigidly connected to said carrier link, wherein said carrier link is welded to said roller frame at three separate points; and
   a plurality of wheels supported by said pins of said roller frame.

2. The wheel roller according to claim 1, wherein said roller frame has two pins and one of said pins is directly and rigidly connected to said carrier link.

3. The wheel roller according to claim 1, wherein said roller frame has two pins and both of said pins are directly and rigidly connected to said carrier link.

4. The wheel roller according to claim 1, wherein said carrier link has an upper section with a first end and a second end, said first end having a vertically oriented wall and one of said pins is rigidly connected to said vertically oriented wall.

5. The wheel roller according to claim 1, wherein said carrier link has a bottom link section, an upper section and an intermediate section connecting said upper section to said bottom link section, said carrier link is formed as a unitary part.

6. The wheel roller according to claim 1, wherein said plurality of wheels is four wheels and none of said four wheels can pivot about said carrier link.

7. The wheel roller according to claim 5, wherein said carrier link has exactly four openings formed therein.

8. The wheel roller according to claim 1, wherein:
   said carrier link has a first length FL; and
   said roller frame has a second length SL, where SL/FL<1.5.

9. The wheel roller according to claim 1, wherein:
   said carrier link has a first length FL; and
   said roller frame has a second length SL, where SL/FL<1.2.

10. The wheel roller according to claim 1, wherein said carrier link has a lower part with a shape selected from the group consisting of a C-shape and a chain link shape.

11. The wheel roller according to claim 1, wherein said plurality of wheels is four wheels disposed on said pins so as to partially overlap said carrier link.

12. The wheel roller according to claim 1, wherein carrier link is forged.

13. A wheel roller, comprising:
   a carrier link having an upper section with a first end and a second end;
   a roller frame supported by said carrier link, said roller frame having pins rigidly connected to said carrier link;
   a plurality of wheels supported by said pins of said roller frame;
   said first end of said carrier link having a vertically oriented wall and one of said pins is rigidly connected to said vertically oriented wall; and
   said roller frame having a top brace plate with a first end and a second end, said second end of said upper section of said carrier link is rigidly connected to said second end of said top brace plate.

14. A wheel roller, comprising:
   a carrier link having a bottom link section, an upper section and an intermediate section connecting said upper section to said bottom link section, said carrier link being formed as a unitary part, said bottom link section having a first width, said intermediate section having a second width and said upper section having a third width, where said third width is greater than said second width, and said first width is greater than said third width;
   a roller frame supported by said carrier link, said roller frame having pins rigidly connected to said carrier link; and
   a plurality of wheels supported by said pins of said roller frame.

* * * * *